US009626284B2

United States Patent
Xue et al.

(10) Patent No.: US 9,626,284 B2
(45) Date of Patent: *Apr. 18, 2017

(54) SYSTEMS AND METHODS TO TEST PROGRAMS

(71) Applicant: VMware, Inc., Palo Alto, CA (US)

(72) Inventors: Lan Xue, Palo Alto, CA (US); Sreevathsa Sathyanarayana, Bangalore (IN); Thor Donbaek Jensen, Hoejbjerg (DK); Erik Lorimer, Sunnyvale, CA (US); James Truong, San Jose, CA (US)

(73) Assignee: VMware, Inc., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/762,938

(22) Filed: Feb. 8, 2013

(65) Prior Publication Data

US 2013/0219222 A1    Aug. 22, 2013

Related U.S. Application Data

(60) Provisional application No. 61/596,989, filed on Feb. 9, 2012.

(51) Int. Cl.
  *G06F 11/14* (2006.01)
  *G06F 11/36* (2006.01)
(52) U.S. Cl.
  CPC ...... *G06F 11/3672* (2013.01); *G06F 11/3688* (2013.01); *G06F 11/3696* (2013.01)

(58) Field of Classification Search
  USPC .......................................................... 714/28
  See application file for complete search history.

(56) References Cited

U.S. PATENT DOCUMENTS

| | | | | |
|---|---|---|---|---|
| 4,312,066 | A * | 1/1982 | Bantz et al. | 714/30 |
| 5,001,712 | A * | 3/1991 | Splett et al. | 714/703 |
| 6,101,543 | A * | 8/2000 | Alden et al. | 709/229 |
| 6,862,564 | B1 | 3/2005 | Shue et al. | |
| 6,971,048 | B1 * | 11/2005 | Hanson et al. | 714/41 |
| 7,143,024 | B1 | 11/2006 | Goyal et al. | |
| 7,320,114 | B1 * | 1/2008 | Jain | G06F 11/261 714/47.1 |
| 7,467,333 | B2 * | 12/2008 | Keeton et al. | 714/41 |
| 7,689,803 | B2 | 3/2010 | Karr et al. | |

(Continued)

OTHER PUBLICATIONS

Xubin He, "SPEK: A storage perfromance evaluation Kernel module for block level storage systems under faulty conditions", Dependable and Secure Computing, IEEE Transactions on (vol. 2 , Issue: 2 ), Jun. 2005, pp. 1-13.*

(Continued)

*Primary Examiner* — Kamini Patel

(57) ABSTRACT

The embodiments described herein include a host that includes an operating system and a storage simulation module in communication with the host. The storage simulation module includes a pseudo-adapter configured to emulate a storage adapter and a pseudo-storage device coupled to the pseudo-adapter, wherein the pseudo-storage device is configured to emulate a storage device. The storage simulation module is configured to simulate an error event for the pseudo-adapter and/or the pseudo-storage device upon receipt of an operation from the operating system.

21 Claims, 5 Drawing Sheets

(56) References Cited

U.S. PATENT DOCUMENTS

| | | |
|---|---|---|
| 7,831,761 B2 * | 11/2010 | Phelan et al. ............... 711/100 |
| 8,499,057 B2 | 7/2013 | Sundarrajan et al. |
| 2004/0243882 A1 * | 12/2004 | Zhou ............................ 714/38 |
| 2006/0271825 A1 * | 11/2006 | Keaffaber et al. ............ 714/38 |
| 2007/0050686 A1 * | 3/2007 | Keeton et al. ................ 714/48 |
| 2013/0219221 A1 * | 8/2013 | Xue et al. ..................... 714/32 |
| 2014/0088927 A1 * | 3/2014 | Cao ...................... G05B 17/02 703/1 |
| 2014/0181808 A1 * | 6/2014 | Sahota et al. .................. 718/1 |

OTHER PUBLICATIONS

Chaubal, Charu, The Architecture of VMware ESXi, White Paper, VMware, Inc., Palo Alto, CA, 2008, available at http://www.vmware.com/files/pdf/ESXi_architecture.pdf, last visited Feb. 8, 2013.

U.S. Appl. No. 13/762,922, filed Feb. 8, 2013.

* cited by examiner

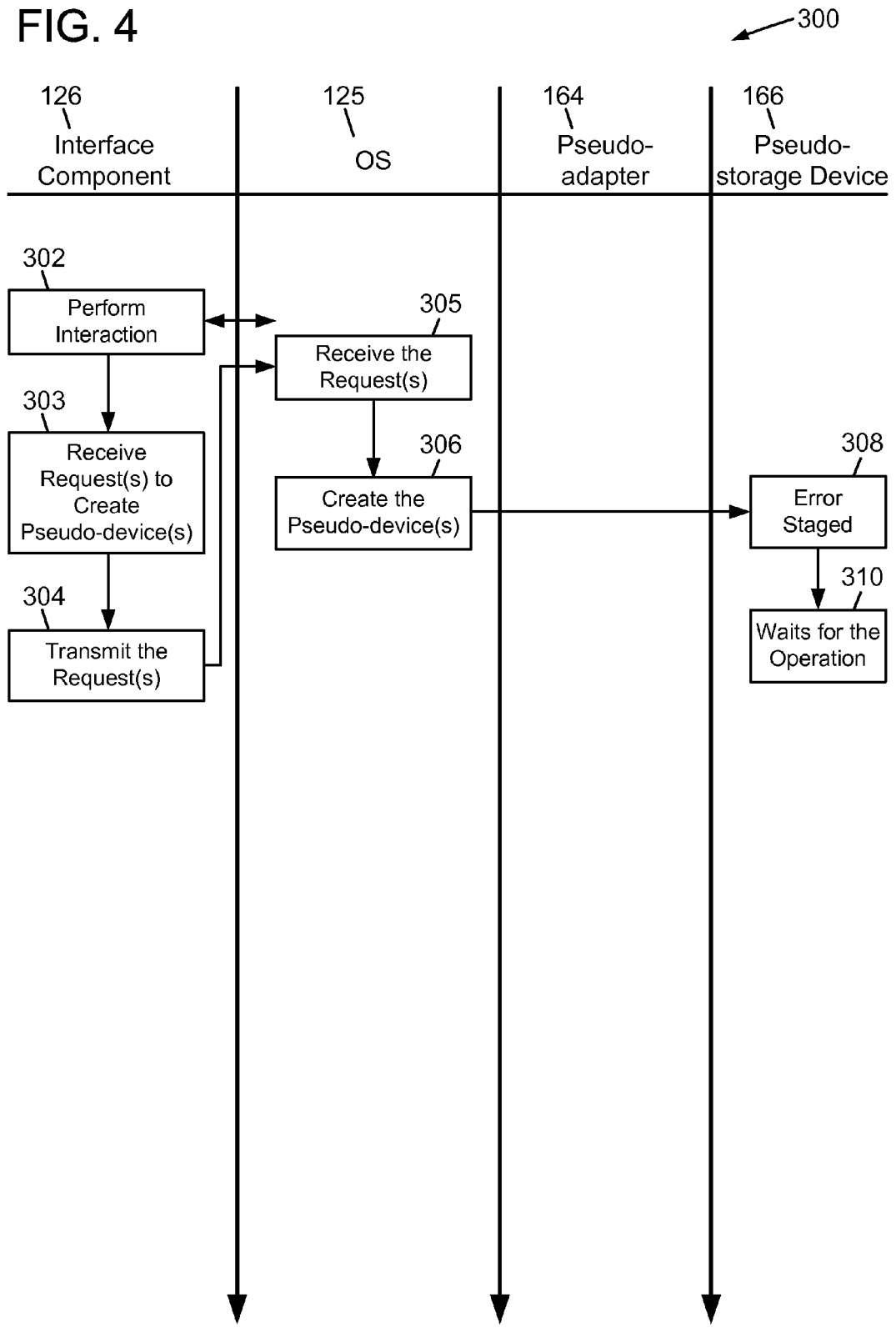

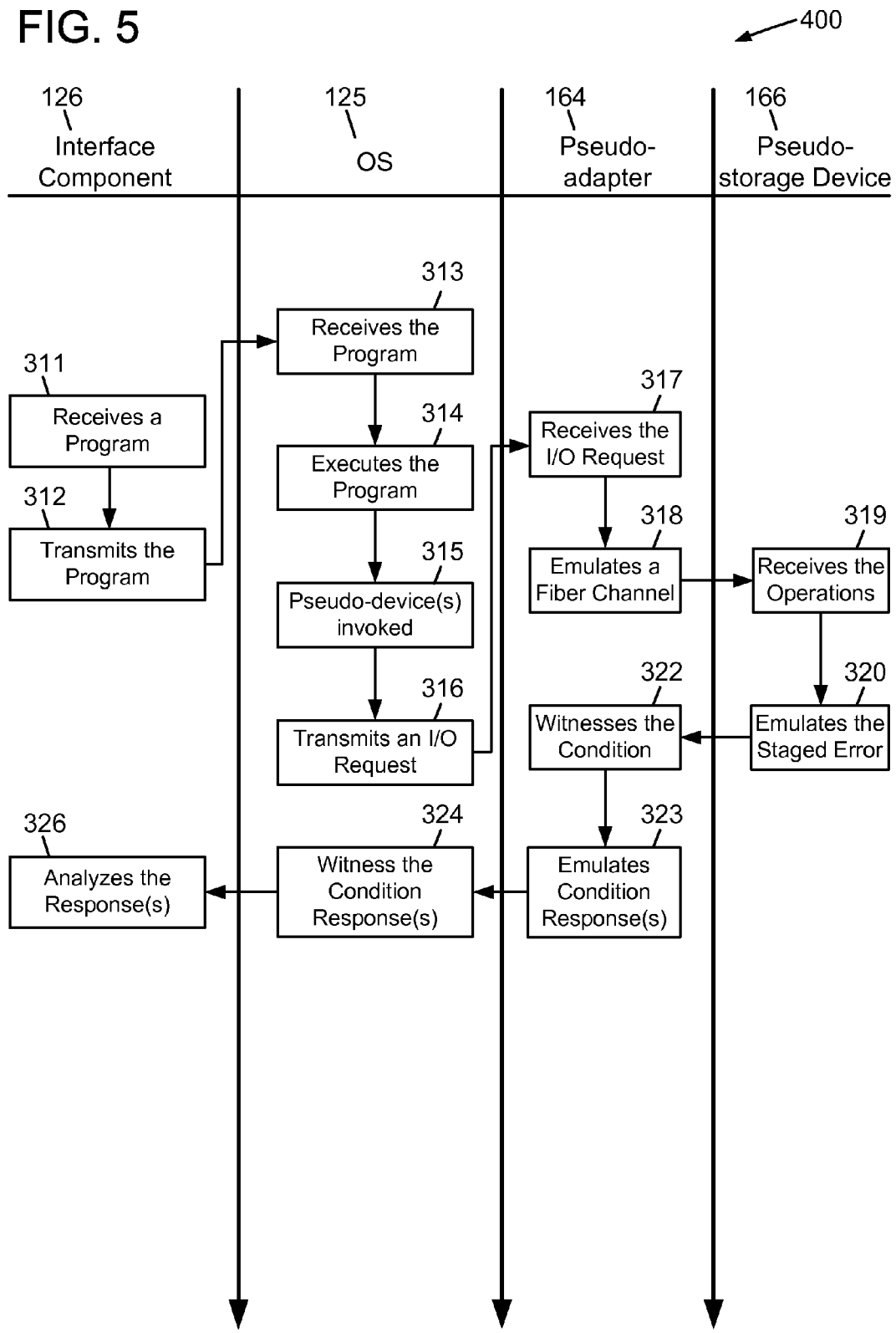

SYSTEMS AND METHODS TO TEST PROGRAMS

CROSS REFERENCE TO RELATED APPLICATION

This application claims priority to U.S. provisional application No. 61/596,989 filed Feb. 9, 2012, which is incorporated herein in its entirety.

BACKGROUND

Many systems use a server-based computing model, such as a virtual desktop infrastructure (VDI) to provide complete, centrally-managed desktops to users using computer virtualization technology. The VDI is used to create large numbers of independent computing environments for large numbers of users. In a typical VDI architecture, user displays and input devices are local, but applications execute remotely in a server. As such, a virtual desktop may be accessible by one or more remote users through a network. The virtual desktop may mimic a desktop computer interface or an interface of another computer or system by providing a virtual screen or virtual display to an end user. A protocol, such as an application programming interface (API), may be used to integrate VDI software components with other products. For example, a VDI operating system component may implement an API to provide an interface with third-party vendor applications such as a custom multi-pathing plugin or device driver for a storage vendor's storage devices.

To ensure that they work adequately and meet a predefined threshold level for quality, APIs need to be tested. Some commonly known testing techniques can be used to test APIs. For example, unit testing, a method used to test individual units of source code, can be used to call APIs with various inputs and validate the resulting outputs. Functional or system testing, which invokes APIs indirectly by running workloads from user space, can also be used to test APIs. Function testing has the advantage of more closely resembling the manner in which users actually use the system.

However, there are limitations to existing testing techniques. For example, various categories of APIs, such as those that may generate failure responses based on the status of other system components, may be difficult to verify with unit tests because unit tests are, by definition, limited to testing individual units of source code. Even if unit tests could handle these types of APIs, a variety of real storage devices may be difficult to procure for testing environments, and staging specific error events or conditions within each of those proprietary storage devices may be difficult or impossible. Functional or system testing approaches are also limited because it may be difficult, if not impossible, for them to call and examine the response to lower-level, kernel APIs by running user space workloads. Finally, error handling code is often tested poorly, as error conditions are difficult to generate deterministically.

SUMMARY

Systems and methods described herein facilitate providing a storage driver level error injection mechanism that can be used for testing programs, such as user programs or application programming interfaces (APIs) and that provide a hardware independent test environment that is highly portable. The embodiments described herein include a host that includes an operating system and a storage simulation module in communication with the host. The storage simulation module includes a pseudo-adapter configured to emulate a storage adapter and a pseudo-storage device coupled to the pseudo-adapter, wherein the pseudo-storage device is configured to emulate a storage device. The storage simulation module is configured to simulate an error event for the pseudo-adapter and/or the pseudo-storage device upon receipt of an operation request from the operating system.

BRIEF DESCRIPTION OF THE DRAWINGS

FIGS. 4 and 5 are each swimlane diagrams of an exemplary method for simulating storage using storage simulation module shown in FIG. 3.

DETAILED DESCRIPTION

Figure 1:
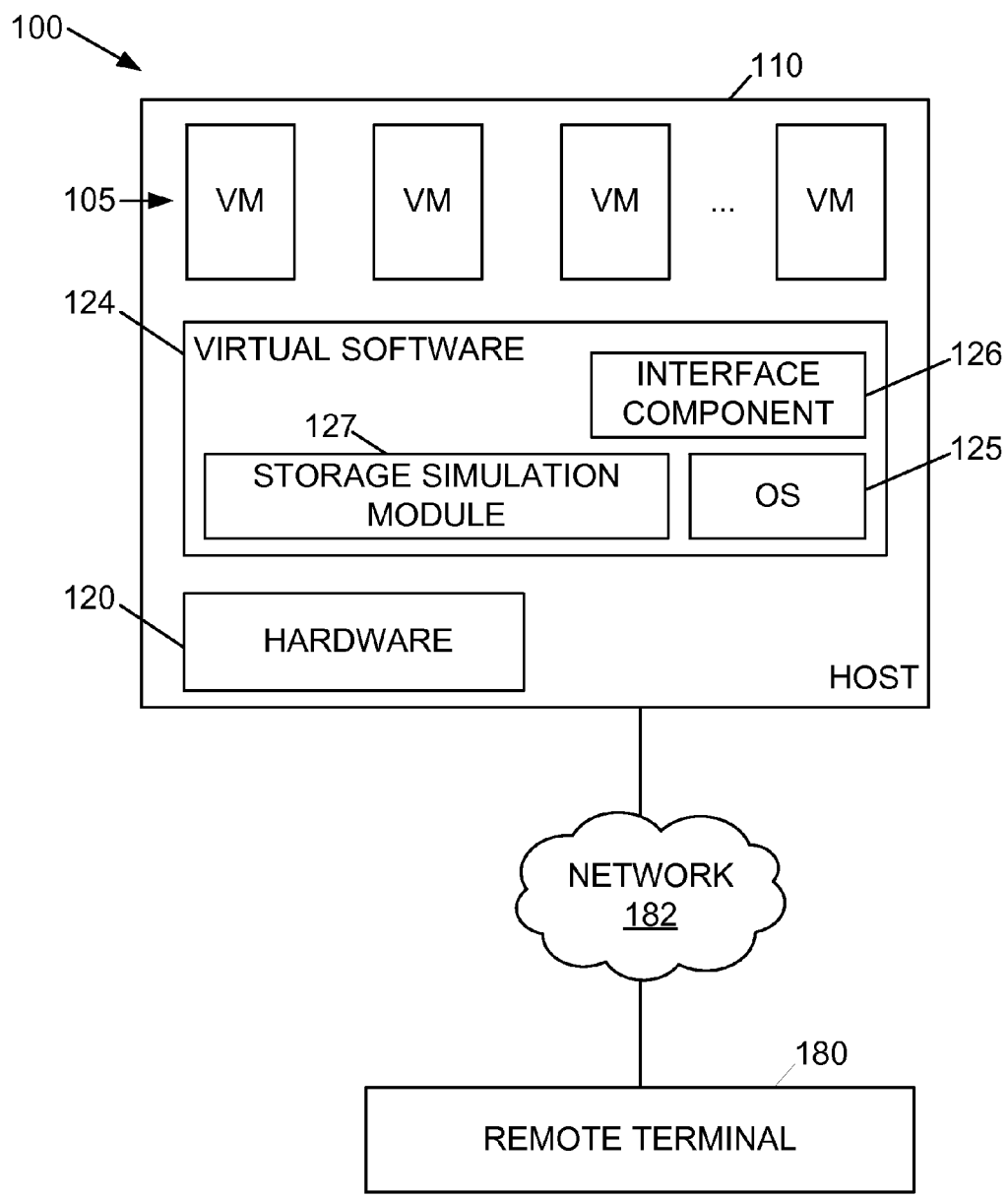
FIG. 1 is a block diagram of an exemplary system.
Figure 2:
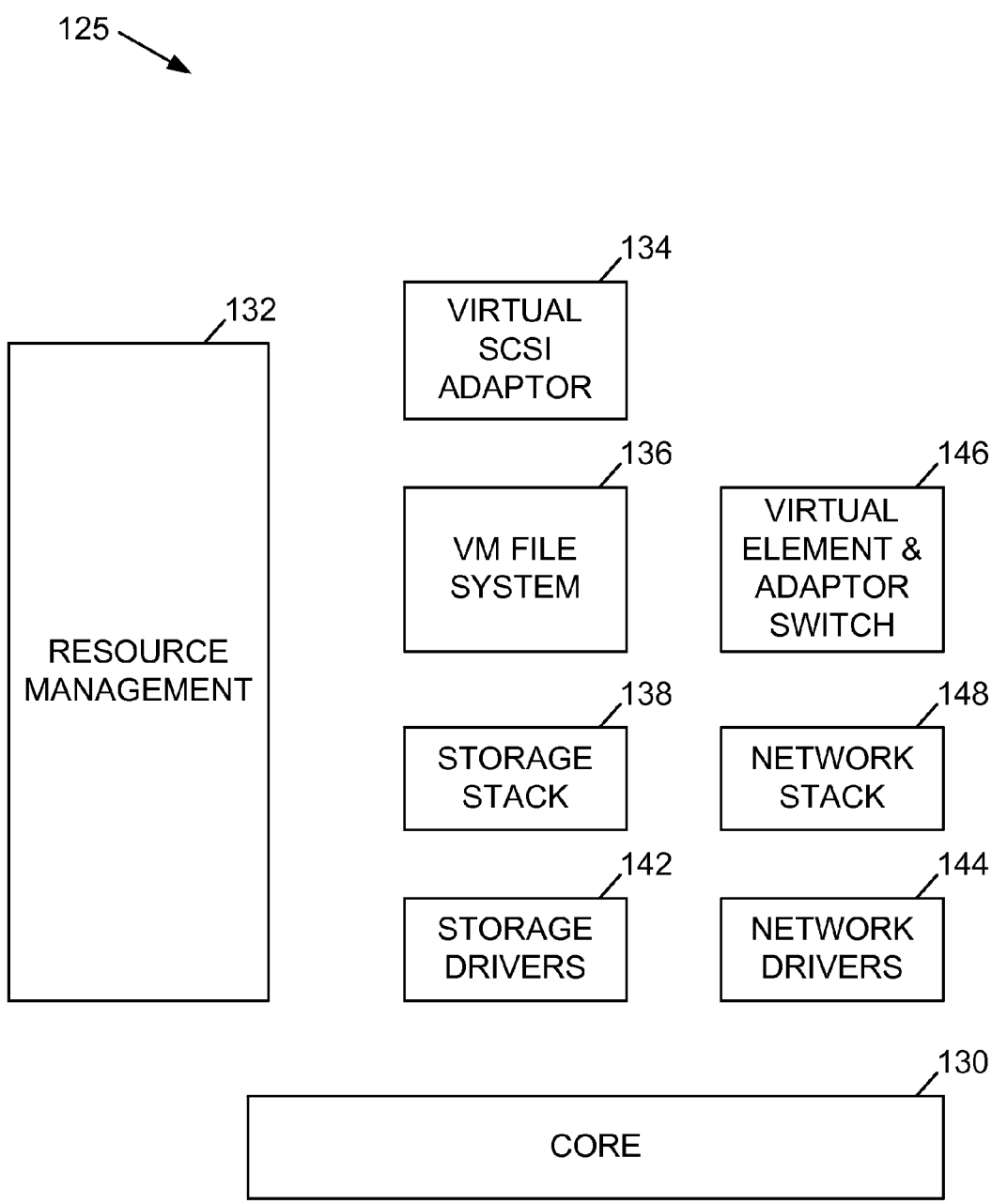
FIG. 2 is a block diagram of an exemplary operating system that can be used with the system shown in FIG. 1.
Figure 3:
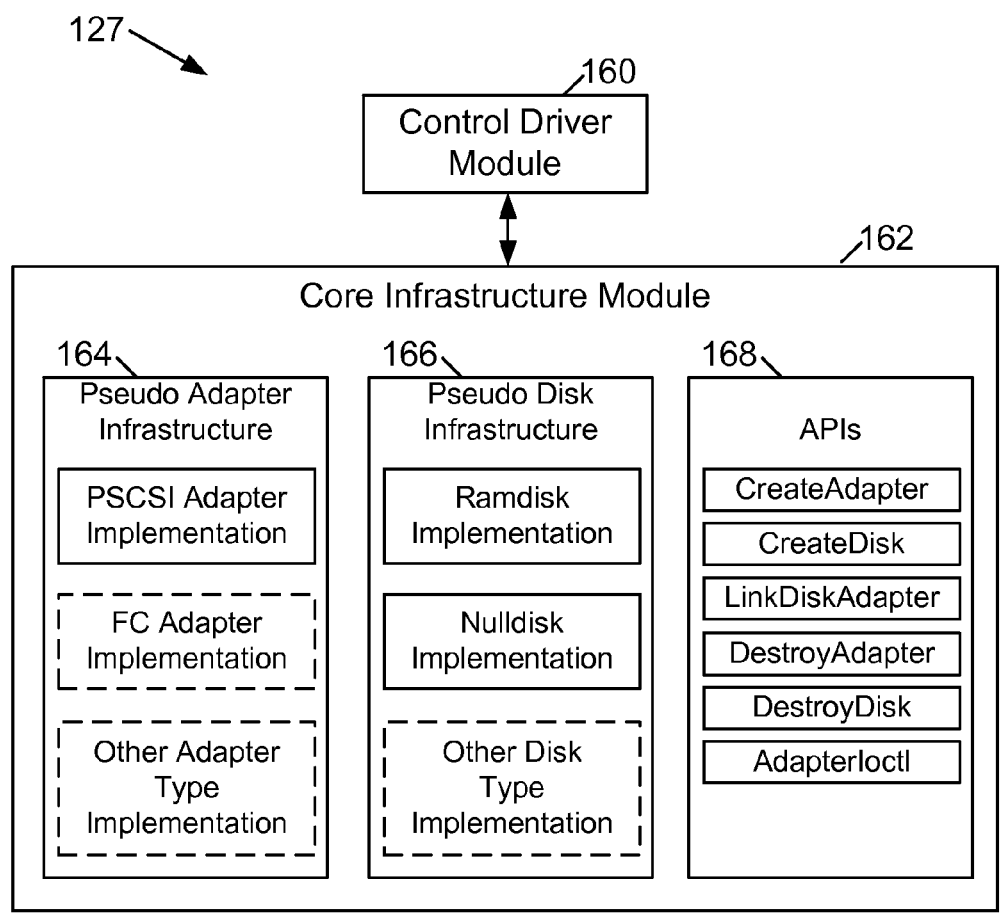
FIG. 3 is an exemplary storage simulation module that can be used with the system shown in FIG. 1.

FIG. 1 is an exemplary system 100. FIG. 2 is an exemplary operating system 125 that can be used with system 100 (shown in FIG. 1). FIG. 3 is an exemplary storage simulation module 127 that is in communication with an operating system (OS) 125 (shown in FIG. 2) and can be used with system 100. Referring to FIG. 1, system 100 is a virtual desktop infrastructure (VDI) having a plurality of virtual machines (VMs) 105 on a physical computer system or host 110. While system 100 is a VDI in the exemplary embodiment, system 100 is not limited to being a VDI. For example, system 100 may be a physical computing system having a physical desktop. In the exemplary embodiment, each VM 105 provides a "desktop" (not shown) to a user of VMs 105. The desktop is an interactive user environment provided by a guest operating system (not shown) and guest applications (not shown) running within each of VMs 105, and generally includes a graphical display, but may include other outputs, such as audio, indicator lamps, tactile feedback, etc. The desktop also accepts input from the user in the form of device inputs, such as keyboard and mouse inputs. In addition to user input/output, the desktop may send and receive device data, such as input/output for a USB device local to the remote user, or to a local printer.

In the exemplary embodiment, each of VMs 105 may be an abstraction of a physical computer system and may also include an operating system, such as Microsoft Windows®, and applications. Windows® is a registered trademark of Microsoft Corporation of Redmond, Wash. Within a VM 105, the operating system is referred to as the "guest OS", and the applications are referred to as "guest applications," wherein the term "guest" indicates it is a software entity that resides within one of VMs 105.

In the exemplary embodiment, an end user (not shown) connects to and interacts with one or more of VMs 105 using a remote terminal 180 that is capable of communicating with host 110 via a network 182, which may be the Internet, a LAN, a WAN, or any combination thereof. Remote terminal 180 may be or include VDI client software executing on a desktop computer, laptop, mobile device, thin client, server, or other similar device. Remote terminal 180 may be capable of displaying the graphical user interface (GUI) for the guest OS running inside each of VMs 105 for the end user, using a computer display or similar device. Remote terminal 180 is also capable of receiving user input from the end user and transmitting the received user input to the guest OS running inside VMs 105.

Host 110, in the exemplary embodiment, includes hardware 120, virtualization software 124 running on hardware 120, and one or more VMs 105 executing on hardware 120 by way of virtualization software 124. Virtualization software 124 is therefore logically interposed between, and interfaces with, hardware 120 and VMs 105. Virtualization software 124 may be implemented directly in hardware, e.g., as a system-on-a-chip, firmware, FPGA, etc. Hardware 120 includes at least one processor (not shown), wherein each processor is an execution unit, or "core," on a microprocessor chip. Hardware 120 also includes system memory (not shown), which is general volatile random access memory (RAM), a network interface port (NIC), a storage system (not shown), and other devices. Virtualization software 124 is sometimes referred to as a hypervisor, and includes software components for managing hardware resources and software components for virtualizing or emulating physical devices to provide virtual devices, such as virtual disks, virtual processors, virtual network interfaces, etc., for each of the VMs 105. More specifically, in the exemplary embodiment, software 124 includes OS 125 that is configured to integrate with other components of VDI 100 and/or other products that may not be a part of host 110 and/or VDI 100. Software 124 also includes a storage simulation module 127 that is in communication with OS 125 and configured to simulate a storage environment within host 110 and to simulate one or more error events, as explained in more detail herein. An interface component 126 may be located within the user space of OS 125. For example, interface component 126 may be a command line interface that is configured to allow a user to administer storage simulation module 127 and OS 125.

In the exemplary embodiment, OS 125 is configured to provide various functions, such as process creation and control, signals, file systems, and process threads. For example, as shown in FIG. 2, OS 125 may be a VMkernel, which is a portable operating system interface (POSIX)-like operating system made available by VMware, Inc. of Palo Alto, Calif., for its products, such as vSphere ESX. While OS 125 is a VMKernel in the exemplary embodiment, other operating systems may be used, such as, for example, various versions of Linux® and Windows® operating systems. Linux® is a registered trademark of Linux Torvalds. OS 125 includes a core infrastructure 130 that is configured to provide base operating system functionality including, without limitation, facilitating use of hardware 120.

A set of storage drivers 142 interface with core infrastructure 130, and are configured to provide communication gateways between higher-level input/output (I/O) operations and any physical storage available from hardware 120 or presented to host 110 from external sources (not shown). Storage stack 138 is configured to provide logical storage devices (not shown) to OS 125 and its users. The logical storage devices act as gateways for communications between higher-level I/O operations and storage drivers 142. A VM File System 136 is configured to impose file system structure onto the logical storage devices provided by storage stack 138. A virtual small computer system interface (SCSI) adapter 134 is defined within OS 125, and configured to provide emulation of a real SCSI adapter device. OS 125 also includes a resource management module 132 that is configured to provide resource scheduling.

In the exemplary embodiment, OS 125 also includes network drivers 144 configured to provide communication gateways between higher-level I/O operations and any network adapters (not shown) available from hardware 120. Network stack 148 is configured to provide logical administration of network protocols for the network adapters, including, for example, facilitating transmission control protocol/internet protocol (TCP/IP) communications between host 110 and other computing devices, such as remote terminal 180 through network 182. In the exemplary embodiment, OS 125 also includes a virtual element adapter and switch 146 that is configured to emulate a network interface card (NIC) (not shown) as well as a network to which the NIC may be attached. For example, virtual element adapter and switch 146 may emulate an Ethernet adapter attached to an Ethernet switch. Virtual element adapter and switch 146 is configured to interact with network stack 148, as well as with OS 125.

In the exemplary embodiment, each of the VMkernel Core infrastructure 130, storage stack 138, storage driver 142, network stack 148, and network drivers 144 are programs that may provide application programming interface (APIs) that enable OS 125 to be integrated with other APIs or features of products that are not a part of host 110 and/or VDI 100. For example the APIs of OS 125 may be integrated with APIs of products that are not part of host 110 and/or VDI 100 (i.e., external APIs). Such external APIs may include a user space program or a kernel space program, such as an API that can be embedded in OS 125 or, otherwise, can be loaded into the kernel (not shown) of OS 125. Moreover, in the exemplary embodiment, storage simulation module 127 is in communication with OS 125. As shown in FIG. 3, storage simulation module 127 includes a control driver module 160 and a core infrastructure module 162. In the exemplary embodiment, control driver module 160 is configured to act as an interface between a user-space configuration utility (not shown) and core infrastructure module 162.

Moreover, in the exemplary embodiment, core infrastructure module 162 includes one or more pseudo-adapters 164 that are coupled to one or more pseudo-storage devices 166. Pseudo-adapter 164 is configured to emulate a storage adapter. More specifically, pseudo-adapter 164 is configured to emulate one of a plurality of real storage adapter such as, for example, a fiber-channel host bus adapter (HBA), a fibre-channel over ethernet (FCoE) adapter, a parallel SCSI adapter, a serial attached SCSI adapter, or an iSCSI adapter. Pseudo-storage device 166, in the exemplary embodiment, is configured to emulate a storage device. More specifically, pseudo-storage device 164 is configured to emulate one of a plurality of real storage devices such as a locally-attached disk, a SAN-attached disk, or a tape drive. In some embodiments, pseudo-storage device 166 is configured to provide functioning storage, such as through use of a memory-based disk, or use of physical storage available to host 110. In other embodiments, pseudo-storage device 166 is configured to provide non-functioning storage, for example a null disk, representing situations when emulation needs require merely receipt of write operations without any corresponding need for read operations.

Storage simulation module 127 also includes APIs 168 that are configured to perform configuration operations on pseudo-adapters 164 and pseudo-storage devices 166. Configuration operations for pseudo-adapters 164 may include creating pseudo-adapters, deleting pseudo-adapters, and operations associated with staging error events for pseudo-adapters. Configuration operations for pseudo-storage devices 166 may include creating pseudo-disks, deleting pseudo-disks, and operations associated with staging error events for pseudo-disks. While the exemplary embodiment includes storage simulation module 127, other types of agents or modules may be used. In one embodiment, APIs 168 may be used to provide error configuration and staging for pseudo-adapter 164 and pseudo-storage device 166. Control driver module 160 may also be used to provide error configuration functionality.

During operation of VDI 100, as described in further detail with respect to FIGS. 4 and 5, user programs or APIs, such as VMkernel Core infrastructure 130, storage stack 138, storage driver 142, network stack 148, and/or network drivers 144 can be tested by using storage simulation module 127 to ensure that they will perform adequately under various conditions. More specifically, a test environment is first created. For example, a user operating in user space of OS 125 may send one or more configuration commands to control driver module 160 via interface component 126. The commands include one or more requests for the creation of pseudo-devices. More specifically, in the exemplary embodiment, the commands include a request for the creation of pseudo-adapter 164 to simulate an adapter, such as a fiber channel adapter, and a request for the creation of pseudo-storage device 166 to simulate a storage device, such as a memory-based disk. In response to those commands, core infrastructure module 162 creates a new instance of the pseudo-fiber channel adapter (i.e., pseudo-adapter 164), as well as a RAM disk (i.e., pseudo-storage device 166) presented as a child of the pseudo-fiber channel adapter. OS 125 does not distinguish between real hardware devices and pseudo-devices such as pseudo-adapter 164 and pseudo-storage device 166, so any I/O operations presented to OS 125 for the pseudo-devices will be treated naturally, as if the devices were real.

Further, the user may stage an error, such as a read-failure error. As such, during the next I/O operation associated with one of the created pseudo-devices, that pseudo-device may react according to the configured error. For example, during the next I/O operation associated with pseudo storage device 166, the read-failure error may be provided as a response by pseudo-storage device 166.

After the test environment is created, the user programs or APIs may then be tested (hereinafter referred to as the "test program"). More specifically, a user space program, such as a relational database management system (not shown), a kernel space program, such as an API that is embedded in OS 125, or a third-party multi-pathing plugin or device driver (not shown) may be provided to host 110. The created pseudo-devices, such as pseudo-adapters 164 and pseudo-storage devices 166, are then used to support testing of the test program. For example, error events are simulated on pseudo-adapters 164 and/or pseudo-storage devices 166 contemporaneously during operation of the test program. As such, the error events can be witnessed by the test program. The test program is then analyzed to examine how the test program reacted to the error events.

This technique enables testing of aspects of the test program's interactions with external API and/or devices that would have been impracticable to test. More specifically, the use of storage simulation module 127, including the pseudo-devices (i.e., pseudo adapter 164 and pseudo-storage device 166), establishes external structure that more accurately emulates a testing environment having physical hardware, which may be required in order to test certain aspects of the test program's operation. This approach facilitates the deterministic execution of specific code sections of the program by 1) establishing a pseudo-device that will emulate a real device; and 2) carefully staging and injecting a condition, such as an artificial error condition, that will invoke the specific code section. Deterministic injection of an artificial error using a pseudo-device avoids having to involve real hardware as well as trying to force that real hardware into a particular state or condition.

FIGS. 4 and 5 are each swimlane diagrams 300 and 400, respectively, of an exemplary method for simulating storage using storage simulation module 127 (shown in FIGS. 1 and 3) and, more particularly, using pseudo-adapter 164 and pseudo-storage device 166 for testing a test program within or external to OS 125 that is located within host 110 (shown in FIG. 1). This method may be embodied within a plurality of computer-executable instructions stored in one or more memories, such as one or more computer-readable storage media. Computer storage mediums may include non-transitory storage medium such as volatile and nonvolatile random access memory, removable and non-removable mediums implemented in any method or technology for storage of information such as computer-readable instructions, data structures, program modules or other data. The instructions may be executed by one or more processors to perform the functions described herein.

Referring to FIG. 4, interface component 126 configures a test environment based on certain desired test conditions. For example, the test conditions may include simulating a device failure, such as an HBA failure or a disk failure. In configuring the test environment, interface component 126 performs an interaction with OS 125 to provide functions associated with establishing the needed components and events for the user's test scenario in operation 302. In one embodiment, interface component 126 may conduct user program or API calls with OS 125 to establish or perform the interaction.

A user may then input requests or commands to facilitate the testing via interface component 126. For example, in operation 303, interface component 126 receives one or more requests to create one or more pseudo-devices. More specifically, in the exemplary embodiment, interface component 126 receives a request to create a pseudo-adapter 164, such as, for example, a pseudo-device emulating a fiber channel adapter. Interface component 126 also receives a request to create a pseudo-storage device 166, such as, for example, a pseudo-device emulating a disk device. In operation 304, interface component 126 transmits the request to create one or more pseudo-devices to core infrastructure module 162 (shown in FIG. 3) within OS 125. OS 125 receives the request in operation 305.

In operation 306, the requested pseudo-device(s) are created. More specifically, in the exemplary embodiment, pseudo-adapter 164 and pseudo-storage device 166 may be created by core infrastructure module 162 (shown in FIG. 3) within OS 125. After the pseudo-devices are created in operation 306, an error event is staged on one of the pseudo-devices. For example, a user may wish to test a response of the test program in an adapter-failure situation, or in a disk-failure situation, or in a high-latency situation. The pseudo-device with the staged error awaits a particular operation from the test program, based on the type of error. In the exemplary embodiment, an error event is staged on pseudo-storage device 166 in operation 308. As such, pseudo-storage device 166 waits for a particular operation from the test program in operation 310. In the exemplary embodiment, during testing, pseudo-storage device 166 acts as a target of I/O operations for the test program. Pseudo-storage device 166 may be a child device to pseudo-adapter 164, thus requiring the test program and pseudo-storage device 166 to communicate with each other through pseudo-adapter 164, thereby emulating a device hierarchy commonly found in mid-range computing settings.

Referring to FIG. 5, the user then provides to OS 125 the test program, via interface component 126, which may operate in user space or may be a kernel-level module that is loaded in OS 125, such as a multi-pathing plugin or device driver (not shown). In some embodiments, the test program may be provided in one or more of VMs 105 (shown in FIG. 1) operating on OS 125. In the exemplary embodiment, in operation 311, interface component 126 receives the test program and interface component 126 transmits the test program to OS 125 in operation 312. OS 125 receives the test program in operation 313. Upon receiving the test program, OS 125 executes the test program in operation 314. During execution of the test program, in operation 315, the test program invokes one or more of the pseudo-devices. More specifically, in the exemplary embodiment, the test program may be expressly customized to immediately invoke pseudo-storage device 166, or the user may engage the test program in its normal use and await a condition in which the test program invokes pseudo-storage device 166. For example, the test program may invoke pseudo-storage device 166 in an I/O operation, such as a read request. The test program utilizes pseudo-adapter 164 in order to facilitate the read request. In many real hardware architectures, an I/O operation destined for a target storage device would go first to an adapter, and then be passed through to the target storage device. Analogously, the test program communicates the read request to pseudo-adapter 164 in order to communicate with pseudo-storage device 166.

In operation 316, OS 125 transmits the I/O request to pseudo-adapter 164. Pseudo-adapter 164 receives the I/O request in operation 317. Upon receiving the I/O request from OS 125, pseudo-adapter 164 emulates a fiber channel adapter by initiating the appropriate I/O operations with pseudo-storage device 166 in operation 318. In operation 319, pseudo-storage device 166 receives the I/O operations and then emulates the staged error in operation 320. Pseudo-storage device 166 may automatically emulate the staged error regardless of the type of I/O operation received, or pseudo-storage device 166 may check for a particular type of I/O operation or a particular condition and determine whether or when the staged error is appropriate for manifestation. For example, pseudo-storage device 166 may be configured to emulate a high-latency situation by spacing I/O responses with a certain delayed timing, or may emulate a disk failure situation by not responding to the I/O operation at all.

In operation 322, pseudo-adapter 164 witnesses the condition manifested by pseudo-storage device 166, and emulates an appropriate condition response based on the error in operation 323. For example, in the high-latency situation, an actual fiber channel adapter in that situation may merely pass the I/O response blocks back to the user program and OS 125 as they are received, where in turn storage stack 138 of OS 125 will act naturally on this latency by possibly sending an abort for the I/O to the pseudo-adapter 164 and/or the pseudo-storage device 166. While, in the exemplary embodiment, the error is staged on the pseudo-storage device, the error may be staged on the pseudo-adapter 164. If the error is staged on the pseudo-adapter 164 rather than on the pseudo-storage device 166, then the pseudo-adapter 164 may not engaged the pseudo-storage device 166 at all, but merely emulated the appropriate condition. For example, pseudo-adapter 164 may be configured to emulate a signal failure situation, such as signal loss upon a cabling being unplugged or severed. Pseudo-adapter 164 then returns a response to OS 125 and to the test program that emulates a signal loss. In other embodiments, the error may be staged on the pseudo-adapter, but may require interaction with the pseudo-storage device before the error manifests itself.

The test program, in operation 324, witnesses responses, or lack thereof, from pseudo-adapter 164 based on the original I/O operation initiated. In the exemplary embodiment, the test program executes its own internal code based on the conditions presented by the error. If the error condition was properly configured in operation 308, the sections of the test program that react to the error condition should be executed. In operation 326, the responses of the test program can be analyzed. In the exemplary embodiment, the user can analyze the responses of the test program to the witnessed conditions, thereby facilitating testing of specific aspects of the test program through the use of the systems and methods described herein. For example, in the case of testing a multi-pathing plugin, the user may have been testing how the test program reacts to a path failure stemming from a failure of a host bus adapter. The emulation of what looks like a real path failure to the test program creates an environmental situation more accurately depicting an actual path failure, without the need to create the situation using real hardware. The user can then witness reactions of the test program based on the reactions of other components, such as OS 125, to the condition, thereby not only invoking particular portions of the test program, but also more completely simulating the situation the test program might encounter during live operation. The systems and methods described herein thus facilitate targeted testing of specific sections of code within the test program by enabling the simulation and staging of specific events, such as specific error conditions, thus allowing more complete testing of the test program.

The various embodiments described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system— computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

In addition, as mentioned above, one or more embodiments of the present invention may also be provided with a virtualization infrastructure. While virtualization methods may assume that virtual machines present interfaces consistent with a particular hardware system, virtualization methods may also be used in conjunction with virtualizations that do not correspond directly to any particular hardware system. Virtualization systems in accordance with various embodiments, implemented as hosted embodiments, non-hosted embodiments or as embodiments that tend to blur distinctions between the two, are all envisioned. Furthermore, various virtualization operations may be wholly or partially implemented in hardware, or implemented with traditional virtualization or paravirtualization techniques. Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claims(s).

What is claimed is:

1. A system comprising:
a host comprising:
an operating system;
at least one computing device;
a creation module configured to:
receive a request from a user to test a program on said at least one computing device, and
in response to the request, create a pseudo-device configured to emulate said at least one computing device, said pseudo-device in communication with said operating system, and
a processor programmed to:
simulate a staged error event on said pseudo-device based on an operation from the program to allow an analysis of a response of the program to the simulation of the staged error event,
wherein the processor is further programmed to simulate the staged error event on said pseudo-device upon determining that the staged error event is appropriate for manifestation by checking for a particular type of I/O operation or a particular condition.

2. The system of claim 1, further comprising an interface module that is configured to provide a program to the operating system.

3. The system of claim 1, wherein said pseudo-device is further configured to emulate a plurality of computing devices.

4. The system of claim 1, wherein said computing device is a storage-adapter.

5. The system of claim 2, wherein the program is loaded into a kernel of said operating system.

6. The system of claim 2, wherein the program provides one or more of the following to said pseudo-device: an input operation and an output operation.

7. A method of testing a program using a computer system including an operating system, the method comprising:
receiving a request from a user to test the program on a computing device;
in response to the request, creating a pseudo-device configured to emulate the computing device; and
simulating a staged error event on the pseudo-device based on an operation from the program to allow an analysis of a response of the program to the simulation of the staged error event, including simulating the staged error event on the pseudo-device upon determining that the staged error event is appropriate for manifestation by checking for a particular type of I/O operation or a particular condition.

8. The method of claim 7, wherein the program provides one or more of the following to the pseudo-device: an input operation and an output operation.

9. The method of claim 7, further comprising loading the program into a kernel of the operating system.

10. The method of claim 7, further comprising:
receiving a request to test the program on a second computing device; and
in response to the request, creating an additional pseudo-device within the operation system, wherein the additional pseudo-device is a child of the pseudo-device.

11. The method of claim 7, wherein the pseudo device is a pseudo-adapter configured to emulate a fiber channel adapter.

12. The method of claim 7, further comprising receiving, from the pseudo, a response to the error event.

13. The method of claim 7, further comprising initiating, by the program, an operation to the pseudo device, wherein simulating the error event further comprises simulating the error event contemporaneously with the operation.

14. A non-transitory computer-readable storage medium having computer-executable instructions embodied thereon, wherein, when executed by at least one processor, the computer-executable instructions cause the at least one processor to:
receive a request from a user to test a program on a computing device;

in response to the request, create a pseudo device configured to emulate the computing device; and simulate a staged error event on the pseudo device based on an operation from the program to allow an analysis of a response of the program to the simulation of the staged error event, wherein the computer-executable instructions further cause the at least one processor to simulate the staged error event on the pseudo-device upon determining that the staged error event is appropriate for manifestation by checking for a particular type of I/O operation or a particular condition.

15. The non-transitory computer-readable storage medium of claim 14, wherein the program provides one or more of the following to the pseudo-device: an input operation and an output operation.

16. The non-transitory computer-readable storage medium of claim 14, wherein the computer-executable instructions further cause the at least one processor to receive a request to simulate the error event on the pseudo device.

17. The non-transitory at least one computer-readable storage medium of claim 14, wherein the operating system does not distinguish between the computing device and the pseudo-device.

18. The system of claim 1, wherein the received operation is error free.

19. The system of claim 1, further comprising a second computing device communicatively coupled to said at least one computing device, and wherein said creation module is further configured to:
   receive a request to test the program on said second computing device;
   in response to the request, create a second pseudo-device within said operation system; and
   wherein the processor is further programmed to simulate an additional error event on said second pseudo-device.

20. The method of claim 7, further comprising:
   receiving a request to test the program on a second computing device;
   in response to the request, creating a second pseudo-device configured to emulate the second computing device; and
   simulating an additional error event on the second pseudo-device.

21. The non-transitory computer-readable storage medium of claim 14, wherein the computer-executable instructions further cause the at least one processor to:
   receive a request to test the program on a second computing device;
   in response to the request, create a second pseudo-device configured to emulate the second computing device; and
   simulate an additional error event on the second pseudo-device.

* * * * *